United States Patent Office 3,179,623
Patented Apr. 20, 1965

3,179,623
METHOD OF PREPARING A MONOMER HAVING PHENOXY AND METHACRYLATE GROUPS LINKED BY HYDROXY GLYCERYL GROUPS
Rafael L. Bowen, Washington, D.C., assignor to the United States of America as represented by the Secretary of Commerce
No Drawing. Original application Jan. 30, 1959, Ser. No. 790,308, now Patent No. 3,066,112. Divided and this application June 26, 1961, Ser. No. 119,748
7 Claims. (Cl. 260—47)

This invention relates to a new monomer, and to methods of preparing same. The new monomer is herein described as a binder for use in preparing dental fillings for anterior teeth, although it is useful wherever a monomer polymerizable at normal temperatures (i.e., 20° C.–37° C.) is desirable. The new monomer is characterized by the attachment of methacrylate groups to hydroxy glyceryl groups which in turn are linked to phenoxy groups.

The present invention is a division of application Serial No. 790,308, filed January 30, 1959, in the name of Rafael L. Bowen, now U.S. Patent 3,066,112.

The two direct filling materials available to dentists at the present time capable of matching the teeth in appearance are the silicate cements and the methyl methacrylate-based resins. Silicate cements not only lack strength at the edges thereby presenting difficulties in connection with building up cutting edges and corners but they are also soluble in mouth fluids. The methyl methacrylate direct filling resins now in use, on the other hand, have a relatively high shrinkage upon hardening, high coefficient of thermal expansion, low stiffness and low compressive strength.

It is therefore an object of the present invention to provide a new monomer capable of being polymerized at normal temperatures into an insoluble, dimensionally-stable material.

Another object of this invention is to provide a new monomer and process for the preparation thereof which is suitable where, as in dental work, curing temperatures must not exceed normal temperatures, and the monomer must be quick-setting, of improved strength and durability.

It is an additional object to provide a monomer having low shrinkage upon hardening, low coefficient of thermal expansion, high stiffness, and high compressive strength.

Other, further, and more specific objects of this invention will become readily apparent to persons skilled in the art from a consideration of the following description, including specific examples.

The dental material of the present invention consists of approximately 70 percent by weight of finely divided fused silica particles that can be used as untreated aggregate or which may optionally be treated with a finishing or keying agent and which particles are bound together by about 30 percent by weight of a crosslinked organic polymer of original composition and chemical structure.

In accordance with one embodiment of the present invention the reaction product of bisphenol A and glycidyl methacrylate, thinned with tetraethyleneglycol dimethacrylate and activated with dimethyl-para-toluidene hardens at room temperature in about 3 minutes when mixed with fused silica powder containing benzoyl peroxide. This tooth-colored solid had a compressive strength of 11,000 pounds per square inch in accordance with the American Dental Association Specification No. 9. When the filler is optionally treated as by the addition of a keying agent such as vinyl silane, the compressive strength was increased to 16,000 p.s.i. The optical opacity of such composition is about $35_{C_{0.70}}$ whereas the solubility and disintegration is 0.04 percent in accordance with the A.D.A. Specification No. 9 test for Dental Silicate Cement. When part of the fused silica was replaced with colorless flint glass (refractive index 1.5795), the X-ray opacity was between that of enamel and dentin without visual differences in color or opacity. When 5 parts benzoyl peroxide per 100 parts resin was used with 74 to 83 percent vinyl silane treated silica, the compressive strength averaged 22,000 p.s.i.

Example 1

As a specific example, two or more moles of glacial methacrylic or acrylic acid may be reacted with one mole of the diglycidyl ether of a bisphenol, such as 4-4'-dihydroxy-diphenyl-2,2-propane, or other similar or analogous epoxide containing compound.

Other suitable examples of epoxide-containing compounds include substances having the formulas:

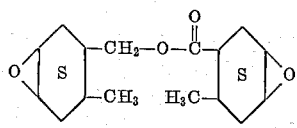

3,4-epoxy-6 methyl cyclohexyl methyl-3,4-epoxy-6 methyl cyclohexane carboxylate wherein S refers to saturated rings,

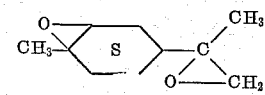

dl-Limonene dioxide

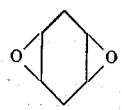

1 : 4 cyclohexadiene dioxide and

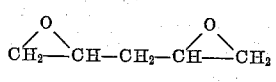

1 : 4-pentadiene dioxide

To this reaction is then added about 0.5 to 1.0 percent or more of a tertiary amine, such as dimethyl-para-toluidene, which catalyzes the above methacrylic or acrylic acid addition to the indicated epoxide groups and also activates the peroxide catalyst when, at a later time, hardening or solidifying of the material is desired. These ingredients (the methacrylic acid, epoxide and amine) are stirred and held at approximately 60° C. in the presence of a free radical polymerization inhibitor until a standard test for epoxide or acid indicates the reaction is complete. The reaction takes place in accordance with the formula

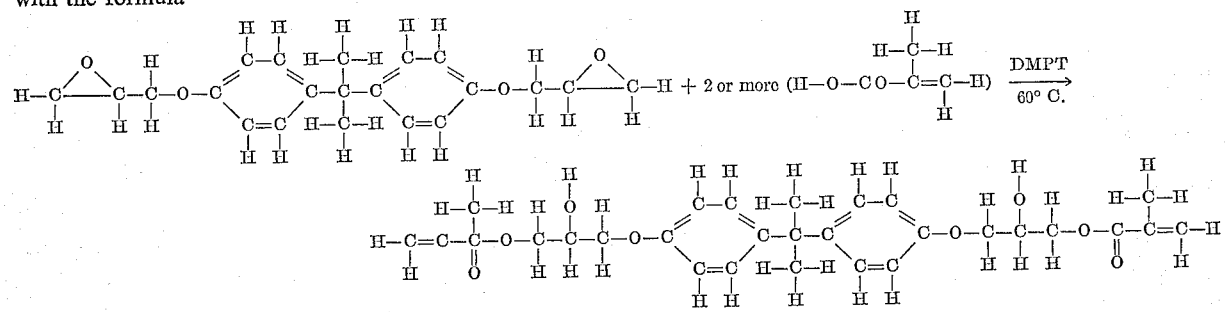

Example 2

As another example of a method for synthesizing the polymerizable intermediate used in connection with the present invention, the condensation of the sodium or other salt of bisphenol A (bis 4-hydroxyphenyl dimethyl methane), or other suitable phenolic compound, with an equivalent amount of the reaction product of glycidyl methacrylate or glycidyl acrylate and anhydrous hydrochloric acid may be made in accordance with the following formula:

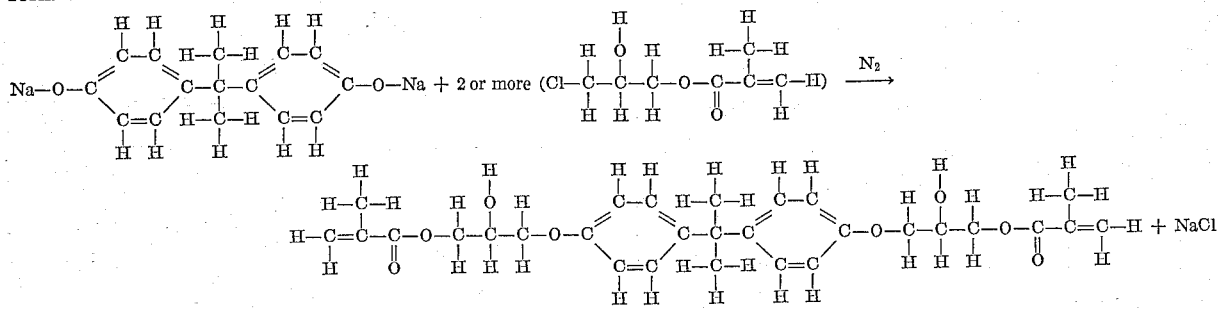

The sodium chloride may then be removed from the reaction product by washing in any conventional manner.

Example 3

A preferred method of synthesizing this polymerizable intermediate or monomer is given by the reaction

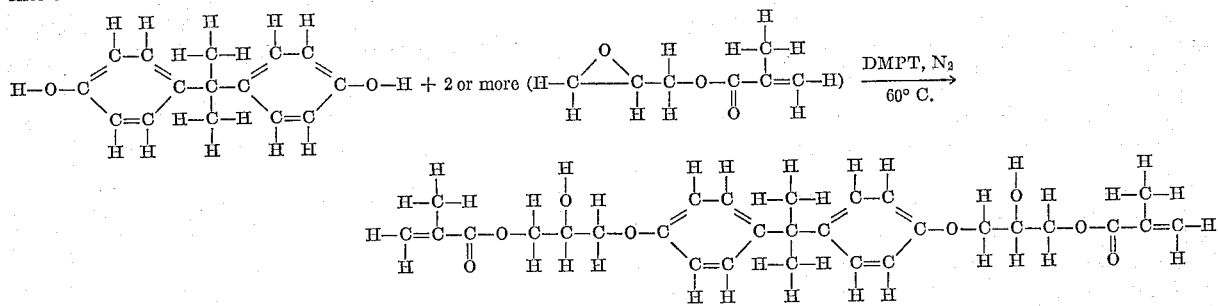

wherein two moles or more of glycidyl methacrylate are combined with one mole of bisphenol A, or other suitable phenolic compound, and 0.5 to 1.0 percent or more of a tertiary amine, such as dimethyl-para-toluidene.

Other suitable phenolic compounds include substances having the formula

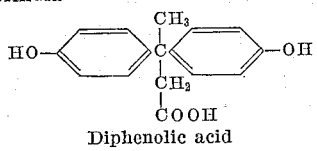
Diphenolic acid or

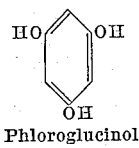
Phloroglucinol

The tertiary amine will catalyze the addition of the phenolic hydroxyl groups to the epoxide groups and also serve to activate the peroxide catalyst, such as benzoyl peroxide (incorporated in the filler), to polymerize the resin intermediate at room temperature by a free radical mechanism when hardening of the mixture is desired. The glycidyl methacrylate, bisphenol and alkaline catalyst are held in a nitrogen atmosphere at approximately 60° C. with continual stirring until the reaction is complete in accordance with the following new test.

In said test a few drops of the reaction product are mixed with enough fused silica powder (or other reinforcing filler), which contains approximately 2 percent benzoyl peroxide, to produce a stiff paste. This composition is then placed between two films of polyethylene, or is in some other way protected from atmospheric oxygen, and thereafter heated to 90° C. A negative test is indicated by the sample failing to harden whereas in a positive test the sample hardens within 10 minutes. The phenolic hydroxyl groups inhibit free radical polymerization until the phenol groups are used up (etherified) by the addition reaction with the oxirane (epoxy) groups.

When a positive test indicates the reaction, as described in any of the aforementioned examples, is complete, approximately 0.006 percent hydroquinone is added to prevent premature polymerization of the methacrylate or acrylate groups. The hydroquinone is dissolved in enough concentrated hydrochloric acid to react with any excess or remaining epoxide groups.

The reaction product is then reduced in viscosity to a medium syrup by the addition of methyl methacrylate, ethylene or tetraethylene glycol dimethacrylate or other suitable reactive diluents.

The syrup or resin intermediate is then ready for use with the treated fused silica powder containing benzoyl peroxide or other suitable catalyst.

A period of 3 to 10 minutes expires between the start of the mix and the time the material hardens. However, this time may be reduced by adding more activator (dimethyl-para-toluidene or para-toluene sulfinic acid). On the other hand, hardening time may be lengthened by "washing out" some of the dimethyl-para-toluidene or other tertiary amine catalyst with a dilute aqueous hydrochloric acid solution.

To use the material, the treated silica powder, containing a suitable catalyst, such as about 1.25 percent by weight benzoyl peroxide, is mixed with the sirupy liquid organic material (heretofore described) which contains a suitable activator, such as dimethyl-para-toluidene or para-toluene sulfinic acid, and the mixed aggregate is promptly placed in the cavity to be filled, wherein it hardens at mouth temperature within 10 minutes by polymerization of the organic material.

Any reinforcing filler, pigment or other inclusion, in a resin-bonded material, should be treated with a suitable keying agent or finish that is capable of forming stable chemical bonds to both the resin and the included material. In the case of vinyl silane, the hydrolyzed silicone can combine by condensation with the surface of the fused silica particles, exposing vinyl groups which can copolymerize with the resin when it hardens. Illustrating this, the silica-resin material was allowed to harden on the surfaces of glass slides that were vinyl silane treated and controls that were untreated. They were then immersed in water. The patches of material came loose from the untreated slides within two days but adhered to the treated glass surfaces for a year.

Glass surfaces and fused silica powder that have been treated with vinyl silane are water repellent; when untreated, if clean, they are very hydrophilic.

If the surfaces of pigment or filler particles have, by their nature, greater affinity for water than they have for the organic resin binder, they will be sources of stress concentration and mechanical weakness when serving in the moist oral environment.

From the foregoing it will be appreciated that the present invention provides a new monomer that is readily polymerized at normal temperatures, including room and body temperatures. The monomer may be prepared in several ways from readily-available materials. As shown in the formulas of the examples, the monomer is characterized by phenoxy and acrylate or methacrylate groups linked by glycerol residues, specifically by the group 2 hydroxy, 1,3-glyceryl. Thus, the monomer has vinyl groups available for polymerization and hydroxyl groups which reduce polymerization shrinkage.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. The method of preparing a monomer polymerizable at normal temperature, which comprises mixing with a polyglycidyl ether of a polyhydric phenol an amount of at least one member of the class consisting of acrylic acid and methacrylic acid sufficient to provide substantially one carboxyl radical of said acid class member for each epoxy radical of said polyglycidyl ether, about 0.5% to about 1.0% by weight of dimethyl-para-toluidene, and a free radical polymerization inhibitor, heating the mixture to about 60° C., stirring said mixture until substantially all of said epoxy and carboxyl radicals are esterified, and discontinuing said heating.

2. The method of preparing a monomer polymerizable at normal temperature, which comprises mixing with a polyglycidyl ether of a dihydric phenol an amount of at least one member of the class consisting of acrylic acid and methacrylic acid sufficient to provide substantially one carboxyl radical of said acid class member for each epoxy radical of said polyglycidyl ether, about 0.5% to about 1.0% by weight of dimethyl-para-toluidene, and a free radical polymerization inhibitor, heating the mixture to about 60° C., stirring said mixture until substantially all of said epoxy and carboxyl radicals are esterified, and discontinuing said heating.

3. The method of preparing a monomer polymerizable at normal temperatures, which comprises mixing with a diglycidyl ether of 4-4'-dihydroxy-diphenyl-2,2-propane an amount of at least one member of the class consisting of acrylic acid and methacrylic acid sufficient to provide substantially one carboxyl radical of said acid class member for each epoxy radical of said diglycidyl ether, about 0.5% to about 1.0% by weight of dimethyl-para-toluidene, and a free radical polymerization inhibitor, heating the mixture to about 60° C., stirring said mixture until substantially all of said epoxy and carboxyl radicals are esterified, and discontinuing said heating.

4. The method of preparing a monomer polymerizable at normal temperatures, which comprises mixing with the sodium salt of a polyhydric phenol an amount of the reaction product of at least one member of the class consisting of glycidyl acrylate and glycidyl methacrylate and at least one member of the class consisting of anhydrous hydrogen chloride, hydrogen bromide and hydrogen iodide sufficient to provide substantially one halohydrin radical of said reaction product for each phenate radical of said salt, stirring said mixture in an inert atmosphere until substantially all of said halohydrin and phenate radicals are combined, and washing out the salt produced by the combination in a water bath.

5. The method of preparing a monomer polymerizable at normal temperatures, which comprises mixing with the sodium salt of 4-4'-dihydroxy-diphenyl-2,2-propane an amount of the reaction product of at least one member of the class consisting of glycidyl acrylate and glycidyl methacrylate and at least one member of the class consisting of anhydrous hydrogen chloride, hydrogen bromide and hydrogen iodide sufficient to provide substantially one halohydrin radical of said reaction product for each phenate radical of said salt, stirring said mixture in an inert atmosphere until substantially all of said halohydrin and phenate radicals are combined, and washing out the salt produced by the combination in a water bath.

6. The method of preparing a monomer polymerizable at normal temperatures, which comprises mixing with at least one member of the class consisting of glycidyl acrylate and glycidyl methacrylate an amount of a polyhydric phenol sufficient to provide substantially one hydroxyl radical of said polyhydric phenol for each epoxy radical of said at least one member, and about 0.5% to about 1.0% of dimethyl-para-toluidene, heating the mixture to about 60° C., stirring said mixture until substantially all of said hydroxyl radicals are etherified with said epoxy radicals, and discontinuing said heating.

7. The method of preparing a monomer polymerizable at normal temperatures, which comprises mixing with at least one member of the class consisting of glycidyl acrylate and glycidyl methacrylate an amount of a bis-phenol consisting essentially of 4-4'-dihydroxy-diphenyl-2,2-propane sufficient to provide substantially one hydroxyl radical of said bis-phenol for each epoxy radical of said at least one member, and about 0.5% to about 1.0% of dimethyl-para-toluidene, heating the mixture to about 60° C., stirring said mixture until substantially all of said hydroxyl radicals are etherified with said epoxy radicals, and discontinuing said heating.

References Cited by the Examiner

UNITED STATES PATENTS

| 2,129,685 | 9/38 | Graves | 260—47 |
| 2,556,075 | 6/51 | Erickson | 260—88.3 |
| 2,824,851 | 2/58 | Hall | 260—47 |

WILLIAM H. SHORT, *Primary Examiner.*

H. N. BURSTEIN, *Examiner.*